United States Patent
Trefcon et al.

(10) Patent No.: US 12,335,219 B2
(45) Date of Patent: Jun. 17, 2025

(54) SUBSCRIPTION AND NOTIFICATION METHODS, AND ENTITIES CONFIGURED FOR IMPLEMENTING THESE METHODS

(71) Applicant: ORANGE, Issy-les-Moulineaux (FR)

(72) Inventors: Michel Trefcon, Chatillon (FR); Philippe Bertin, Chatillon (FR); Alexandra Ansiaux, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 18/553,381

(22) PCT Filed: Apr. 1, 2022

(86) PCT No.: PCT/FR2022/050617
§ 371 (c)(1),
(2) Date: Sep. 29, 2023

(87) PCT Pub. No.: WO2022/208034
PCT Pub. Date: Oct. 6, 2022

(65) Prior Publication Data
US 2024/0187367 A1    Jun. 6, 2024

(30) Foreign Application Priority Data
Apr. 2, 2021   (FR) ..................... 2103448

(51) Int. Cl.
*H04L 51/224* (2022.01)
*H04L 67/02* (2022.01)

(52) U.S. Cl.
CPC ............ *H04L 51/224* (2022.05); *H04L 67/02* (2013.01)

(58) Field of Classification Search
CPC .............................. H04L 51/224; H04L 67/02
(Continued)

(56) References Cited

U.S. PATENT DOCUMENTS 7,743,137 B2 * 6/2010 Sarwono ............. H04L 41/0686
714/39
10,742,744 B1 * 8/2020 Mahalank ............. H04L 43/065
(Continued)

FOREIGN PATENT DOCUMENTS

WO    WO-2007009396 A1 *   1/2007   ....... H04L 29/06027

OTHER PUBLICATIONS

Orange, "Modifications in the NRF service APIs for the support of compression", vol. CT WG4, No. E-Meeting; Feb. 24, 2020-Feb. 28, 2020, Mar. 5, 2020 (Mar. 5, 2020), 3GPP Draft, portal.3gpp.org/ngppapp/DownloadTDoc.aspx?contributionUid=C4-200791 (Year: 2020).*

(Continued)

*Primary Examiner* — Ruolei Zong
(74) *Attorney, Agent, or Firm* — David D. Brush; Westman, Champlin & Koehler, P.A.

(57) ABSTRACT

A method for subscribing a first communicating entity to a second communicating entity. The method is implemented by the first entity and includes: requesting subscription to the second entity in order to obtain information regarding at least one event monitored by the second entity, this subscription request indicating at least one encoding format supported by the first entity; and following detection by the second entity of a the event corresponding to the subscription request, receiving, from the second entity, a notification comprising information relating to the detected event and encoded by way of a the encoding format supported by the first entity and indicated in the subscription request.

20 Claims, 2 Drawing Sheets

(58) Field of Classification Search
USPC .......................................................... 709/206
See application file for complete search history.

(56) References Cited

U.S. PATENT DOCUMENTS

| | | | |
|---|---|---|---|
| 2016/0330298 A1 | 11/2016 | Min et al. | |
| 2020/0252813 A1* | 8/2020 | Li | .......................... H04W 24/08 |
| 2022/0405153 A1* | 12/2022 | Xu | .......................... H04W 24/02 |
| 2023/0246724 A1* | 8/2023 | Pateromichelakis | ........................ H04W 72/0453 370/329 |
| 2024/0049060 A1* | 2/2024 | Narasimham | ......... H04W 28/24 |
| 2024/0155334 A1* | 5/2024 | Liu | .......................... H04L 61/35 |
| 2024/0193021 A1* | 6/2024 | Pateromichelakis | ... H04L 43/10 |

OTHER PUBLICATIONS

English translation of the Written Opinion of the International Searching Authority dated Jul. 11, 2022 for corresponding International Application No. PCT/FR2022/050617, filed Apr. 1, 2022.
Orange, "Modifications in the NRF service APIs for the support of compression", vol. CT WG4, No. E-Meeting; Feb. 24, 2020-Feb. 28, 2020, Mar. 5, 2020 (Mar. 5, 2020), 3GPP Draft; CP-200020, 3rd Generation Partnership Project (3GPP), Mobile Competence Centre; 650, Route Des Lucioles ; F-06921 Sophia-Antipolis Cedex; France, Retrieved from the Internet: URL:https://ftp.3gpp.org/tsg_ct/TSG_CT/TSGC_87e/Docs/CP-200020.zip 29510_CR0310_(Rel-16)_C4-200791_Modifications in the NRF service APIs for the support of.
Ericsson et al., "Discussion Paper: Misalignment between Discovery Service and Subs/Notif Service in NRF", vol. CT WG4, No. E-Meeting; Jun. 2, 2020-Jun. 12, 2020, May 22, 2020 (May 22, 2020), 3GPP Draft; C4-203300, 3rd Generation Partnership Project (3GPP), Mobile Competence Centre; 650, Route Des Lucioles; F-06921 Sophia-Antipolis Cedex; France Retrieved from the Internet: URL:https://ftp.3gpp.org/tsg_ct/WG4_protocollars_ex-CN4/TSGCT4_98e_meeting/Docs/.
Reschke Greenbytes J., "Hypertext Transfer Protocol (HTTP) Client-Initiated Content-Encoding; draft-reschke-http-cice-00.txt", Hypertext Transfer Protocol (HTTP) Client-Initiated Content-Encoding; draft-reschke-http-cice-00.txt, Internet Engineering Task Force, IETF Standardworkingdraft, Internet Society (ISOC) 4, Rue Des Falaises CH—1205 Geneva, Switzerland, May 10, 2014 (May 10, 2014), p. 1-6, XP015099079.
"3rd Generation Partnership Project; Technical Specification Group Core Network and Terminals; 5G System; Network Function Repository Services; Stage 3 (Release 17)", vol. CT WG4, No. V17.0.0, Dec. 11, 2020 (Dec. 11, 2020), p. 1-229, 3GPP Standard; Technical Specification; 3GPP TS 29.510, 3rd Generation Partnership Project (3GPP), Mobile Competence Centre; 650, Route Des Lucioles; F-06921 Sophia-Antipolis Cedex ; France, Retrieved from the Internet: URL:https://ftp.3gpp.org/Specs/.
3GPP TS 29.510 V16.6.0 (Dec. 2020), "3rd Generation Partnership Project; Technical Specification Group Core Network and Terminals; 5G System; Network Function Repository Services; Stage 3 (Release 16)," Technical Specification.
3GPP TS 29.518 V16.7.0 (Mar. 2021), "3rd Generation Partnership Project; Technical Specification Group Core Network and Terminals; 5G System; Access and Mobility Management Services; Stage 3 (Release 16)," Technical Specification.
3GPP TS 29.500 V15.4.0 (Jun. 2019), "3rd Generation Partnership Project; Technical Specification Group Core Network and Terminals; 5G System; Technical Realization of Service Based Architecture; Stage 3 (Release 15)," Technical Specification.
International Search Report dated Jul. 11, 2022 for corresponding International Application No. PCT/FR2022/050617, filed Apr. 1, 2022.
Written Opinion of the International Searching Authority dated Jul. 11, 2022 for corresponding International Application No. PCT/FR2022/050617, filed Apr. 1, 2022.

* cited by examiner

[Fig 1]
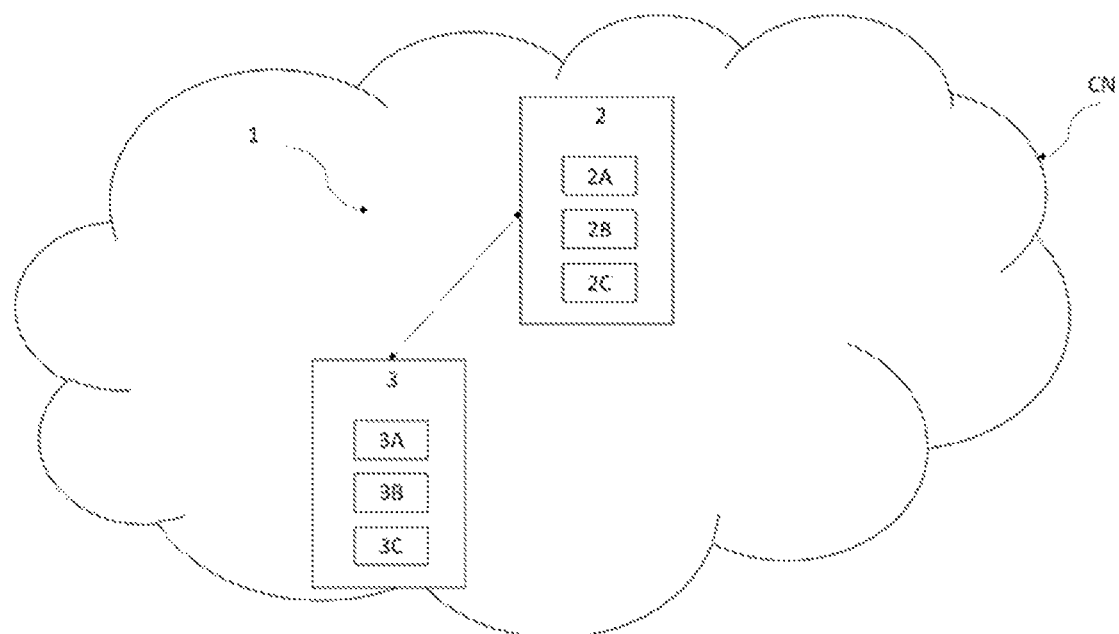
[Fig 2]
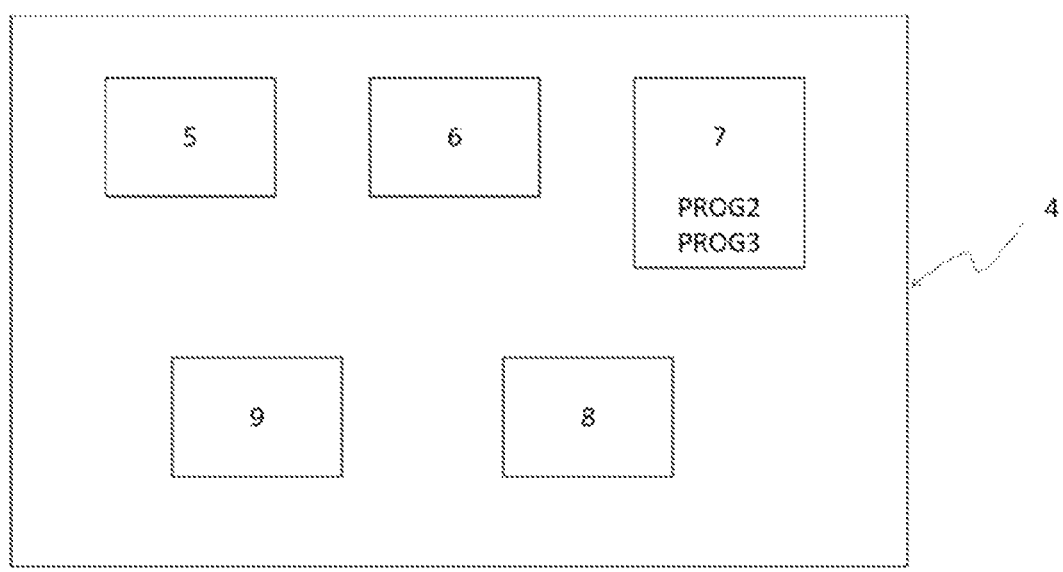

[Fig 3]
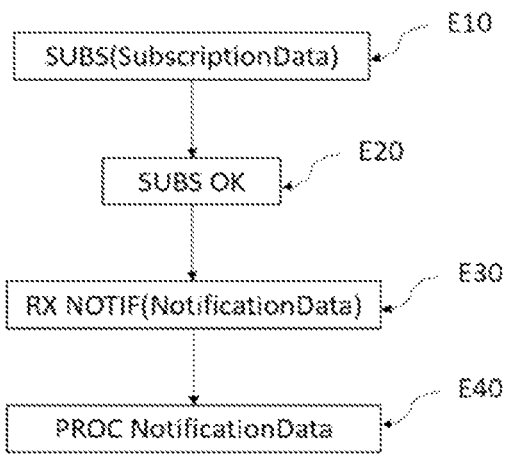
[Fig 4]
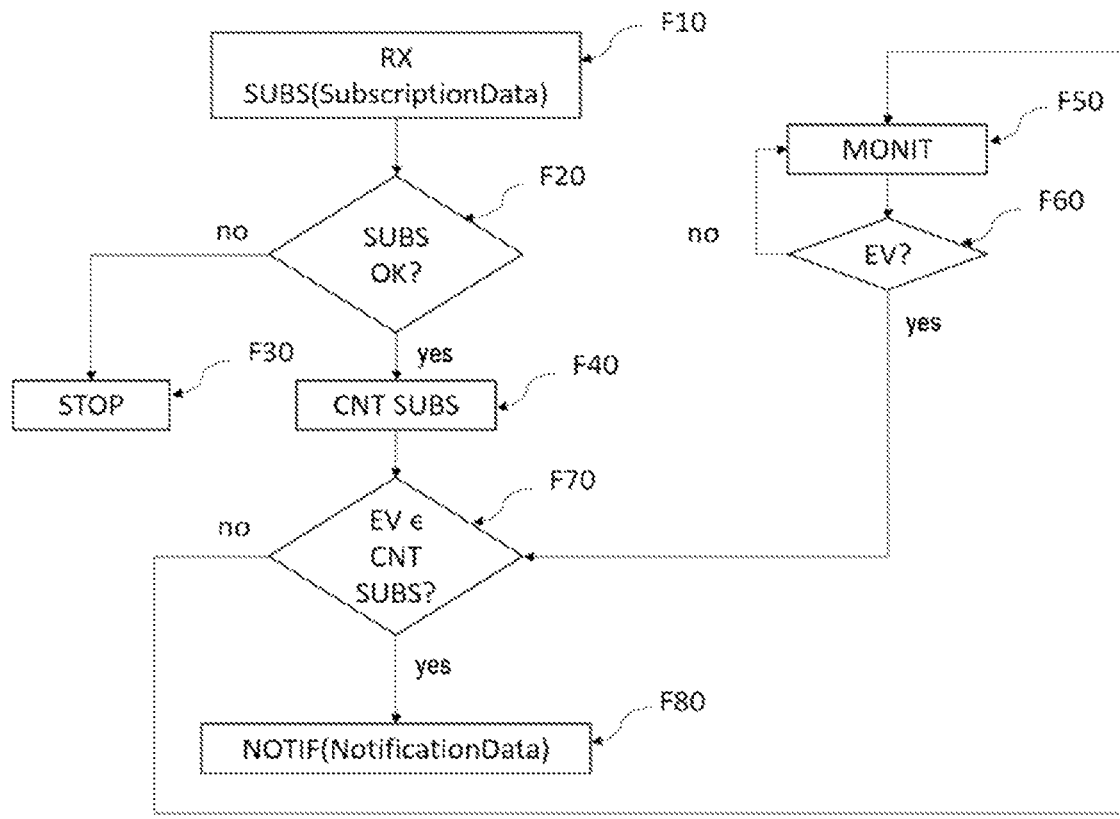

SUBSCRIPTION AND NOTIFICATION METHODS, AND ENTITIES CONFIGURED FOR IMPLEMENTING THESE METHODS

CROSS-REFERENCE TO RELATED APPLICATIONS

This application is a Section 371 National Stage Application of International Application No. PCT/FR2022/050617, filed Apr. 1, 2022, which is incorporated by reference in its entirety and published as WO 2022/208034 A1 on Oct. 6, 2022, not in English.

FIELD OF THE DISCLOSURE

The invention falls within the general field of telecommunications.

More specifically, it relates to the notification of events in a telecommunications network.

The invention has a preferred but non-limiting application in the context of 5th Generation (or 5G) telecommunications networks defined by the 3GPP (or Third Generation Partnership Project) standard.

BACKGROUND OF THE DISCLOSURE

The 5G networks as defined by the 3GPP standard use, in a manner per se known, Network Function Virtualization (or NFV), Software Defined Network (or SDN) and network slicing technologies. These technologies open up unprecedented usage possibilities for telecommunications networks. They notably allow operators to create virtual end-to-end logic networks for their clients, that are bespoke and independent, scalable and flexible, all from the same physical network infrastructure (access network(s), core network, etc.). By means of these virtual logic networks, the operators are capable of providing their clients with optimized solutions for various scenarios corresponding to various constraints in terms of functionalities, performance capabilities and quality of service.

Network function virtualization, or NFV, is based on standard servers for executing network services software (also called network functions or NFs), while the software defined network, or SDN, centralizes the control of the 5G network via software rather than via physical equipment. By virtue of this virtualization, the network functions can be deployed and reconfigured easily, thus providing more flexibility.

Various network functions of a 5G core network thus can be virtualized, such as, for example, the following network functions: Access Mobility Management Function (AMF), Session Management Function (SMF), Network Slice Selection Function (NSSF) or Policy Control Function (PCF), etc. These virtualized functions are controlled in the 5G core network by another network function called Network Repository Function (NRF). This NRF function is responsible for providing a client or "consumer" network function with the information allowing it to interact, directly or indirectly via an intermediary device (or SCP "Service Communication Proxy"), with a server network function ("producer") proposing one or more services in the network.

Indeed, the 5G network architecture defined by the 3GPP standard is a Service Based Architecture (SBA). According to such an architecture, the functionalities of a 5G network are provided by a plurality of virtual network functions (or equally NF functions throughout the remainder of the description) providing services to other functions of the network authorized to access these services, with the same network function being able to offer one or more services. To this end, the NF functions of the 5G core network have the services that they offer in the context of the 5G core network (in other words, their functionalities) by means of interfaces in the form of APIs (Application Programming Interfaces) that the other authorized NF functions can invoke. However, instead of predefined interfaces between the various NF functions that can interact with one another, a service model is used in which the "consumer" NF functions poll the NRF network function to discover the "producer" NF functions and to communicate with them over the APIs that they offer. This advantageously offers the operators of 5G networks significant flexibility and high adaptability.

Thus, the NRF network function is a repository managing a plurality of NF functions, and storing the profiles of each of these NF functions. Each profile comprises a plurality of attributes, characterizing the operational state of the NF function (for example, its availability, its load, how long it has been running, etc.), its features (for example, the type of NF function, how it can be joined, etc.), the services it offers, the resources it manages, etc. Attributes also can be defined more specifically on each service (otherwise those defined on the NF function apply). These profiles allow the "consumer" NF functions to discover the providers of particular service and features in the network.

The NRF network function is updated when activating and deactivating each of the NF functions that it manages (i.e., when registering and deregistering each instance of each of them), as well as each resizing of an NF function (indeed, the NRF function can manage several instances of the same NF function). In addition to the aforementioned discovery service, the 3GPP standard also defines a subscription procedure by which a "consumer" NF function can ask the NRF function to be informed of any event affecting a "producer" NF function, such as, for example, the availability of a new instance of a type of NF function, the updating of an attribute of the profile of an NF function, etc.

Numerous other NF functions of the 5G core network currently propose event exposure services such as that proposed by the NRF function. For example, the "Nsmf_EventExposure" service can be cited that allows "consumer" NF functions to be informed by the SMF function of events relating to a Protocol Data Unit (PDU) session, or even the "Namf_EventExposure" service that allows "consumer" NF functions to be informed by the AMF function of events relating to the access and the mobility of a user equipment, of a group of user equipments or of the set of user equipments managed by the AMF function.

The 5G core network uses, for exchanges between NF functions, and notably the notification of events, the HTTP client-server protocol, and more specifically its HTTP/2 version. In a manner per se known, the HTTP protocol is a protocol initially developed for the web. Optimizing the encoding of the content exchanged via the HTTP protocol (for example, text, images, fonts, etc.), and more specifically the compression of this content, is a key factor currently provided by web parties to reduce latency and bandwidth consumption, and substantially improve the user experience. Applying this principle to exchanges between the NF functions within the 5G core network is also currently contemplated. Indeed, by way of an indication, the payload of a profile of an NF function provided in a request when registering an NF function, or in a response provided by the NRF function during the discovery mechanism, or even in a notification sent by the NRF function when a profile of an NF function is updated, easily can be in the vicinity of 2 megabytes, which, when added to the numbers of messages exchanged over the 5G core network, can constitute a significant complete load.

According to the HTTP/1.1 protocol, during an exchange between a client and a server, the client can indicate, in the request that it transmits to the server, and more specifically in an "Accept-Encoding" header of the request, the various types or encoding formats that it supports (for example, encoding implementing compression such as gzip or deflate). The server then returns a response to the client, the body of which complies with the encoding indications provided by the client, and indicates, in a "Content-Encoding" header of the header of its response, the encoding format (and more specifically the compression) that it has applied to the content given to the client. Negotiating the encoding, when it is implemented, is therefore on the initiative of the client and only relates to the response sent by the server to the client. Before receiving the response from the server, the client has no means of knowing which encoding format the server supports.

In the context of 5G networks, before Release 15.4.0, no encoding negotiation is defined on the API interfaces of the NF functions. In Release 15.4.0, the 3GPP standard introduces general order rules for the encoding negotiation that is notably described in 3GPP document TS 29.500 V15.4.0, June 2019, entitled, "Technical Specification Group Core Network and Terminals; 5G System; Technical Realization of Service Based Architecture; Stage 3 (Release 15)". According to these rules:

- a "consumer" NF function can determine the encoding formats supported by a "producer" NF function by sending it an OPTIONS type request, with the encoding formats supported by the "producer" NF function being returned to it in the response to the OPTIONS request;
- a "producer" NF function can return an "Accept-Encoding" header as described above containing the encoding formats that it supports in a response, for example, a response to a request comprising a body such as an HTTP POST, PUT or PATCH request.

The "consumer" NF function can then use one of the encoding formats provided by the "producer" NF function in order to encode the body, if applicable, of its next request addressed to the "producer" NF function.

However, an OPTIONS request has only been implemented by the 3GPP standard in the API of the NRF function for the Nnrf_NFManagement management service (which includes the aforementioned registration, de-registration and updating operations) and in the API of the AMF function. A generalization of this solution would require implementing the OPTIONS request for all the resources of the various API interfaces of all the NF functions (currently defined and future functions) comprising HTTP requests that can implement encoding of their content, and more specifically the HTTP POST, PUT and PATCH requests. This would not only result in high maintenance of the specifications of the 5G core network, but also in an increase in the volume of the signaling exchanged in the core network (a dedicated transaction for each resource on each API), and in taking into account additional logic for each "consumer" NF function.

The other solution proposed by the 3GPP standard (adding an "Accept-Encoding" header in a response or in a request) is used in Release 16 for services offered by the NSSF network functions (Nnssf_NSSAIAvailability service) and NRF (Nnrf_NFManagement, Nnrf_NFDiscovery and Nnrf_AccessToken services), but its use for the notifications is not explicitly referred to. According to document TS 29.510 entitled, "Technical Specification Group Core Network and Terminals; 5G System; Network Function Repository Services; Stage 3, V16.6.0, December 2020, the "consumer" NF functions should support the use of the gzip encoding format in the notifications sent by the NRF function. However, this constraint is limited to the notifications sent by the NRF network function, and to a single encoding format, namely the gzip format. Furthermore, it is uncertain that a "consumer" NF function in practice supports the gzip encoding format: if this encoding format is not supported, the network function NRF is exposed to the rejection of its notifications.

Therefore, a requirement exists for a solution that does not have the aforementioned disadvantages and that can be homogeneously applied to all the network functions of a 5G core network.

SUMMARY

The invention offers such a solution by proposing a method for subscribing a first communicating entity with a second communicating entity, said method being intended to be implemented by the first entity and comprising:

- a step of requesting subscription with the second entity in order to acquire information concerning at least one event monitored by the relative second entity, with this subscription request indicating at least one encoding format supported by the first entity; and
- following detection by the second entity of one of said events corresponding to the subscription request, a step of receiving, from the second entity, a notification comprising information relating to said detected event that is encoded using one of said encoding formats supported by the first entity and indicated in the subscription request.

Correspondingly, a further aim of the invention is a communicating entity, called first entity, comprising:

- a first module configured to request a subscription with a second network entity in order to acquire information concerning at least one event monitored by the second entity, with this subscription request indicating at least one encoding format supported by the first entity; and
- a second module activated following detection by the second entity of one of said events corresponding to the subscription request, with said second module being configured to receive a notification from the second entity comprising information relating to said detected event encoded by means of one of said encoding formats supported by the first entity and indicated in the subscription request.

A further aim of the invention is a method for notifying a first communicating entity of events, intended to be implemented by a second communicating entity, said notification method comprising:

- a step of receiving a subscription request from the first entity in order to acquire information concerning at least one event monitored by the second entity, with this subscription request indicating at least one encoding format supported by the first entity; and
- following detection by the second entity of one of said events corresponding to the subscription request, a step of sending the first entity a notification comprising information relating to said detected event that is encoded using one of said encoding formats supported by the first entity and indicated in the subscription request.

Correspondingly, a further aim of the invention is a communicating entity, called second entity, comprising:

a reception module, configured to receive a subscription request from a first communicating entity in order to acquire information concerning at least one event monitored by the second entity, with this subscription request indicating at least one encoding format supported by the first entity; and a sending module, activated following detection of one of said events corresponding to the subscription request, and configured to send a notification to the first entity comprising information relating to said detected event encoded using one of said encoding formats supported by the first entity and indicated in the subscription request.

The nature of the first and second communicating entities is by no means limiting. These can be physical or software entities, belonging to the same network or to separate networks. Such communicating entities are, for example, network entities, application functions or even user equipments. It notably can involve application entities, i.e., entities configured to implement determined processing logic, notably such as entities offering and/or consuming services in a network, such as network functions or instances of network functions (for example, AMF, SMF, NRF functions, etc.). However, it also can be other entities such as intermediate equipment located on the communication path between two network functions such as, for example, SCP (Service Communication Proxy) equipment, or even user equipments.

Furthermore, it should be noted that although it has been introduced with reference to a 5G core network, the invention is not limited to this context. It can be applied to other generations of networks (for example, 4G, 6G, and onward), to proprietary networks, or even to other types of networks, implementing event exposure services such as, for example, "event-driven" micro-services architectures, an illustrative of which is example described in the URL https://www.theodo.fr/digital-et-strategie/architectures-event-driven-construisez-des-applications-performantes-et-d%C3%A9coupl%C3%A9es-avec-rabbitmq.

The invention advantageously allows optimization of the transmission of the notifications asynchronously transmitted by the second communicating entity in order to notify the communicating entities that have made the request of various events relating to the elements that it manages and/or monitors (for example, user equipments, network functions, data sessions, etc.). Advantageously, it does not require any specific encoding format, but adapts to the capabilities of the entities that have subscribed to event notification. Of course, such a format can be a compression format such as gzip, deflate, compress, which allows the performance capabilities of the exchanges between the entities to be optimized, notably in terms of latency and bandwidth, but other encoding formats also can be contemplated, such as, for example, a base64 encoding format, an invariant (or "identity") format indicating the absence of transformation of the content, or any reversible transformation carried out for a particular purpose (for example, reducing the size of content, acquiring content compatible with the majority of systems, securing content, etc.), etc. The invention thus offers significant flexibility and allows various encoding formats to be applied to the notifications sent to various entities, or as a function of the context in which the first and second entities are located, or even as a function of the features of the information to be notified (sensitivity, size, etc.).

By virtue of this flexibility, the invention can be applied to numerous communicating entities, and to their respective specific features. It thus offers a homogeneous solution that notably can be transposed to the various network functions of a core network, which facilitates its implementation in a standardized network such as a 3GPP network.

The nature of the notified events is by no means limiting. Of course, they depend on the function of the second communicating entity and the elements that it manages and/or that it monitors. For example, for a network function of the network repository functions type (i.e., an NRF function) that manages network functions, these events can be the creation, the modification or even the deletion of a profile of a network function. For a network function managing access and mobility (i.e., an AMF function) in a network, these events can include the location or the presence of a user equipment, or UE, in an area of interest, or of a group of UEs, the number of UEs in a given area, a loss of connectivity of a UE or of a group of UEs, etc. For a network function managing PDU sessions (i.e., an SMF function), these events can include a change of network or PLMN (Public Land Mobile Network), the release or establishment of a PDU session, a change of access type, etc.

The solution offered by the invention is easily integrated with existing subscription procedures, and in particular in the context of a 3GPP network, with the subscription procedures defined for the various network entities offering an event exposure service, such as the aforementioned NRF, AMF, SMF functions. The encoding formats supported by the first entity only need to be added among the indications provided when subscribing. For example, this format or these formats notably can be provided in the body of the subscription request (for example, in a field provided to this end) with other data relating to the subscription, such as the events the first entity wishes to be notified of, etc.

Therefore, the invention does not require an additional logic to be defined, nor additional messages to be exchanged (such as, for example, an OPTIONS request and the associated response, or a request containing an Accept-Encoding field and the associated response), which allows the performance capabilities of the network to be maintained. On the second entity, the one or more encoding formats supported by the first entity advantageously can be stored in the context of the subscription of the first entity: therefore, the invention is particularly easy to implement.

In a particular embodiment, the second network entity is a control entity managing a plurality of application entities of a network.

This embodiment has a preferred application when the second entity is, for example, an NRF function of a 5G core network managing a plurality of NF network functions or NF function instances. As mentioned above, the NRF function is a repository managing a plurality of NF functions, and storing the profiles of each of these NF functions, with each profile comprising a plurality of attributes characterizing the operational state of the NF function (for example, its availability, its load, how long it has been running, etc.), its features (for example, type of NF function, how it can be joined, etc.), the services it offers, the resources it manages, etc.

In a particular embodiment, each application entity profile managed and stored by the second entity comprises a plurality of attributes including at least one encoding format supported by this application entity.

This embodiment is particularly advantageous since it allows the second entity to not only know the encoding formats supported by an application entity as a "consumer" (when it receives the notifications from the second entity), but also, when the second entity manages this application entity, to know the encoding formats supported by it as a "producer". The second entity is then able to publish this or these encoding formats for entities requesting it, for example, during a procedure for discovering application entities managed by the second entity verifying one or more given criteria.

In a particular embodiment, said detected event is a creation, a deletion or a modification of an element managed by the second entity.

Such an element is, for example, a profile of an application entity managed by the control entity, in the example of an NRF network function. However, other applications of this embodiment can be contemplated. For example, for an AMF function, such an element can be a profile or a user context grouping the registered users in a network and managed by the AMF function.

The relevant element can be any resource monitored by the second entity (for example, a PDU session, a user equipment or a group of user equipments, an IP address, a virtual entity, a physical entity, etc.). The nature of this element is by no means limiting.

In a particular embodiment, the notification sent by the second entity is a request in accordance with a version of the HTTP protocol.

As mentioned above, the invention is preferably applicable in the context of a 5G network based on the HTTP protocol and notably on the HTTP/2 version of this protocol for compressing the content of the notification requests in accordance with this protocol exchanged between the various entities involved in the invention.

However, the invention also applies to protocols other than the HTTP/2 protocol, such as to another version of the HTTP protocol (HTTP/1.1), or to SOAP (Simple Object Access Protocol), CORBA (Common Object Request Broker Architecture), gRPC (Remote Procedure Call), QUIC protocols, etc., or to any other protocol based on exchanging requests and responses, and supporting encoding of the content of the body of the requests and/or of the responses, typically the compression of this content.

In a particular embodiment, at least one encoding format supported by the first entity and indicated in the subscription request is a compression format. Thus, the encoding format used to encode the information relating to the event detected in the notification can be a compression format.

This embodiment allows the performance capabilities and the latency of the network to be optimized. Indeed, depending on the event that initiated the notification and on the configuration of the second entity, such a notification can include a significant amount of data. For example, for an NRF network function, such a notification can include one or more profiles in all or part of the network functions, or only, if applicable, the attributes of the profile or profiles affected by the event. Applying a compression-type encoding format to the information conveyed by the notifications, given the significant number of notifications likely to be sent by the various entities of a network and the amount of data transmitted by each of them, is therefore particularly advantageous in terms of latency and bandwidth.

In a particular embodiment, in the subscription request, said at least one encoding format supported by the first entity is provided in a data structure comprising at least one communication option supported by the first entity.

The use of such a data structure allows the second entity to be notified in brief, during subscription, of several communication options that are supported by the first entity and that can be used when sending the notifications. For example, in addition to the encoding formats, it is possible to contemplate identifying content formats (for example, json, xml, atom, etc.) in this data structure that are supported by the first entity, allowing the second entity to adjust the format of the information it transmits in the notifications to the first entity.

This embodiment provides significant flexibility and is scalable: it facilitates the application of the invention to new constraints, in terms of communication options.

In a particular embodiment of the invention, the subscription and notification methods are implemented by a computer.

A further aim of the invention is a computer program on a recording medium, with this program being able to be implemented in a computer or more generally in a first network entity according to the invention and comprising instructions adapted to implementing a subscription method as described above.

A further aim of the invention is a computer program on a recording medium, with this program being able to be implemented in a computer or more generally in a second network entity according to the invention and comprising instructions adapted to implementing a notification method as described above.

Each of these programs can use any programming language, and can be in the form of source code, object code, or of intermediate code between source code and object code, such as in a partially compiled format, or in any other desirable format.

A further aim of the invention is a computer-readable information medium or a computer-readable recording medium comprising the instructions of a computer program as mentioned above.

The information or recording medium can be any entity or device capable of storing the programs. For example, the medium can comprise a storage means, such as a ROM, for example, a CD-ROM or a microelectronic circuit ROM, or even a magnetic recording means, for example, a hard disk or a flash memory.

Moreover, the information or recording medium can be a transmissible medium such as an electrical or optical signal, which can be routed via an electrical or optical cable, via a radio link, via a wireless optical link or via other means.

The program according to the invention particularly can be downloaded over a network of the Internet type.

Alternatively, the information or recording medium can be an integrated circuit, in which a program is incorporated, with the circuit being adapted to execute or to be used to execute the subscription and notification methods according to the invention.

According to another aspect, the aim of the invention is a system comprising at least one first communicating entity and one second communicating entity according to the invention.

The system benefits from the same aforementioned advantages as the subscription and notification methods and as the first and second communicating entities according to the invention.

It is also possible to contemplate, in other embodiments, that the subscription and notification methods and the first and second communicating entities in combination have all or some of the aforementioned features.

BRIEF DESCRIPTION OF THE DRAWINGS

Further features and advantages of the present invention will become apparent from the following description, with reference to the accompanying drawings, which illustrate a non-limiting embodiment.

The figures show:

FIG. 1 shows a system, in its environment, according to the invention, in a particular embodiment;

FIG. 2 schematically shows the hardware architecture of a computer that can host any one of the communicating entities according to the invention belonging to the system of FIG. 1;

FIG. 3 illustrates, in the form of a flowchart, the main steps of a subscription method implemented by a communicating entity of the system of FIG. 2 in a particular embodiment of the invention; and FIG. 4 illustrates, in the form of a flowchart, the main steps of a notification method implemented by a communicating entity of the system of FIG. 2 in a particular embodiment of the invention.

DESCRIPTION OF THE INVENTION

FIG. 1 shows, in its environment, a system 1 according to the invention, in a particular embodiment in which the system 1 is integrated in a core network CN of a 5G communications network as described in the 3GPP standard.

In the example contemplated in FIG. 1, the system 1 comprises a first communicating entity 2 and a second communicating entity 3 according to the invention implementing an event subscription/notification mechanism within the core network CN. More specifically, it is assumed in this case that the entity 3 is a network entity managing various elements of the core network CN, implemented in the core network CN or attached to the core network CN, such as, for example, network functions (NFs), user equipments (UEs), PDU sessions, etc., and monitoring various types of events relating to these elements. The events monitored by the entity 3 and likely to be published (in other words, to be shared with other entities, such as, for example, with the entity 2) are generally predefined, so that a communicating entity can subscribe to the notification of all or some of these events if it is interested in knowing about them.

As an alternative embodiment, it is possible to contemplate dynamic discovery of the events likely to be published by the entity 3, for example, by polling said entity.

In yet another alternative embodiment, it is possible to contemplate that an entity unconditionally subscribes to all the events likely to be exposed by the entity 3 or to events verifying one or more given criteria.

The invention is not limited to a particular use of the knowledge of the relevant events: the entity, and in particular the entity 2, that has subscribed to the notification of events monitored by the entity 3 can use this knowledge, for example, to manage elements it is responsible for, to implement any processing entrusted to it, etc.

In the embodiment described herein, the two entities are application network entities, i.e., network entities configured to implement determined processing logics in the core network CN, notably such as entities offering and/or consuming services in the core network. More specifically, it is assumed in this case that the entities 2 and 3 are virtualized instances of network functions, such as AMF, SMF, NRF, etc., functions that execute various service logics allowing the main functions of the core network to be provided (for example, management of mobility and access to the core network, definition and application of network policies, billing, selecting network slices, etc.). Each service offered by such a network function can include one or more operations. Throughout the remainder of the description, a network function designates a virtual instance of a network function, with each network function of the core network CN being capable of being instantiated in many ways.

By way of an illustration, and to better understand the invention, throughout the remainder of the description the communicating entity 2 is considered to be an AMF network function and the communicating entity 3 is considered to be an NRF network function (control entity within the meaning of the invention) managing a plurality of NF network functions, such as AMF, SMF, NRF network functions, etc. (application entities within the meaning of the invention). In a known manner, such an NRF function is a repository storing a profile for each of the NF functions that it manages, with said profile comprising a plurality of attributes characterizing the operational state of the associated NF function (for example, its availability, its load, how long it has been running, etc.), its features (for example, type of NF function, how it can be joined, etc.), the services it offers, the resources that these services manage, etc. The NRF function itself proposes a plurality of services notably including services for discovering the NF functions that it manages (and more specifically certain attributes of the profile of these NF functions, called "producer" NF functions, allowing "consumer" NF functions to access the services offered by the "producer" NF functions), for managing (including the aforementioned registration/deregistration/updating operations), for authorizing and initiating (or "bootstrapping"), which use the logic of the Nnrf_NFDiscovery, Nnrf_NFManagement, Nnrf_AccessToken and Nnrf_Bootstrapping services notably described in document TS 29.510 entitled, "Technical Specification Group Core Network and Terminals; 5G System; Network Function Repository Services; Stage 3", V16.6.0, December 2020.

However, the invention is not limited to the assumptions expressed above. As mentioned above, it actually applies to other configurations of the system 1 (several "first" and "second" communicating entities according to the invention), to other networks (for example, other generations of networks defined by the 3GPP standard or by other standards, proprietary networks, micro-services architectures, etc.), as well as to other physical or software communicating entities (for example, to intermediate SCP equipment located on the communication path between two network functions, to application functions, to user equipments, to network entities, etc.), whenever subscription/notification mechanisms are implemented.

Furthermore, in the example contemplated herein, the first and second communicating entities belong to the same core network CN, but the invention also applies when the first and second communicating entities belong to different networks, or when one of the entities is outside the network to which the other entity belongs. It can involve, for example, two NRF network functions belonging to two distinct PLMN networks, or a network function and an external application function, etc.

It also should be noted that the same entity, whether it is a physical or software (virtual) entity, can be configured to be "a first entity" within the meaning of the invention in terms of certain entities (i.e., subscribing to the notification of given events), and "a second entity" within the meaning of the invention in terms of other entities (i.e., notifying given events). For example, in a 5G core network as defined by the 3GPP standard, the AMF network function can be a first entity in terms of the NRF network function, and a second entity in terms of the SMF, NEF ("Network Exposure Function") or UDM ("Unified Data Management") network functions.

In the embodiment described herein, the entities 2 and 3 are software entities, hosted by physical devices of the core network CN, such as servers, for example. These servers in this case have the hardware architecture of a computer 4, as schematically shown in FIG. 2.

The computer 4 notably comprises a processor 5, a random-access memory 6, a read-only memory 7, a non-volatile memory 8, and communication means 9 notably allowing the entities of the system 1 to communicate with each other and with other entities, if applicable, of the core network CN or outside the network CN. These communication means 9 rely, on the one hand, on a wired or wireless communication interface, per se known and not described in further detail herein, but also on one or more SBI (Service Based Interface) software interfaces. These software interfaces are APIs that in this case use the HTTP/2 protocol.

The read-only memory 7 of the computer 4 constitutes a recording medium according to the invention, which can be read by the processor 5 and on which one or more computer programs according to the invention is/are recorded.

More specifically, the read-only memory 7 of the computer 4 comprises, when the computer 4 hosts the entity 2, a recording of a computer program PROG2 comprising instructions defining the main steps of a subscription method according to the invention.

This program PROG2 defines functional modules of a first entity within the meaning of the invention that support or control the hardware elements 5 to 9 of the aforementioned computer 4. These modules comprise, notably in the embodiment described herein, as illustrated in FIG. 1:

a first communication module 2A, configured to request a subscription from the entity 3 in order to acquire information relating to at least one event monitored by the entity 3, with the subscription request indicating at least one encoding format supported by the entity 2; and a second communication module 2B, activated following detection by the entity 3 of one of said events corresponding to the subscription request, with this second module 2B being configured to receive, from the entity 3, a notification comprising information relating to the detected event, encoded by means of an encoding format supported by the entity 2 and indicated in the subscription request.

In the embodiment described herein, the program PROG2 also defines a processing module 2C, configured to use, if applicable, the notifications received by the second communication module 2B in order to manage, in the example contemplated herein, elements of the core network CN, or that are attached thereto, for which the entity 2 is responsible. Thus, in the illustrative example introduced above where the entity 2 is an AMF network function, the operating module 2C is configured to notably use the received notifications to efficiently manage the access and the mobility of the user equipments for which it is responsible.

The functions provided by the modules 2A to 2C of the entity 2 are described in further detail hereafter, with reference to the steps of the subscription method according to the invention.

Similarly, the read-only memory 7 of the computer 4 comprises, when the computer 4 hosts the entity 3, a recording of a computer program PROG3 comprising instructions defining the main steps of a subscription method according to the invention.

This program PROG3 defines functional modules of a second entity within the meaning of the invention that support or control the aforementioned hardware elements 5 to 9 of the computer 4. These modules notably include, in the embodiment described herein, as illustrated in FIG. 1:

a reception module 3A, configured to receive a subscription request from another entity, for example, in this case from the entity 2, in order to acquire information relating to at least one event monitored by the entity 3, with this subscription request indicating at least one encoding format supported by the entity 2. In the illustrative example contemplated herein of an NRF network function managing several network NF functions and storing a profile of attributes for each of these functions, such an event is, for example, the creation, the deletion or the modification of such a profile of attributes, or in the same manner, the registration and the deregistration of network functions managed by the NRF function (which is respectively expressed by the creation and the deletion of a profile on the NRF function), and the modification of a profile of attributes of a network function. Of course, the events monitored by the entity 3 depend on the services (functionalities) provided by this entity 3, in the core network CN in this case, and/or on elements managed by this entity 3. For example, such an event can be the creation, the deletion or the modification of an element managed and/or monitored by the entity 3, but other events can be contemplated. Thus, for an AMF network function, such events can comprise, for example, as mentioned above, the location or the presence of a UE or of a group of UEs in an area of interest, the number of UEs in a given area, a loss of connectivity of a UE or of a group of UEs, etc. For an SMF network function, these events can include a change of network or PLMN, the release or establishment of a PDU session, a change of access type, etc.;

a monitoring module 3B, configured to continuously or quasi-continuously monitor the elements managed by the entity 3 and to detect, if applicable, the aforementioned events relating to these elements; and a sending module 3C, activated following detection by the monitoring module 3B of an event corresponding to the subscription request of the network entity 2 received by the reception module 3A, and configured to send the network entity 2 a notification comprising information relating to this detected event, that is encoded by means of an encoding format supported by the network entity 2 and indicated in the subscription request.

The functions provided by the modules 3A to 2C of the entity 3 are described in further detail hereafter, with reference to the steps of the notification method according to the invention.

The main steps of a subscription method and of a notification method according to the invention will now be described with reference to FIGS. 3 and 4, respectively, as they are respectively implemented by the entity 2 and by the entity 3, in a particular embodiment.

It is assumed in this case that the events monitored by the entity 3 and the elements that it manages and/or monitors (in the example contemplated in this case, elements of the core network CN or attached to the core network CN) are known, and therefore, in particular, of the entity 2.

The manner by which this information is acquired by the entity 2 is by no means limiting. It can be configured by the equipment manufacturer providing the entity 2, notably based on specifications describing the entity 3. This is notably the case of the network functions in a 5G core network, or, more generally, in a core network defined by the 3GPP standard, with these events and these elements being described in the specifications relating to these network functions. Thus, in the illustrative example contemplated herein of an entity 3 comprising an NRF network function, this information is described in the aforementioned document TS 29.510, notably in paragraph 5.2.2.5. According to this document, the events monitored by the NRF network function are the registration and the deregistration of an NF function managed by the NRF function, as well as the modification of a profile of an NF function managed by the NRF function, i.e., in the same manner, as already mentioned, the creation, the deletion and the modification of a profile of a network function managed by the entity 3, capable of being published thereby from third party entities. Such a profile is an element managed by the entity 3 within the meaning of the invention.

As an alternative embodiment, this information can be dynamically acquired by the entity 2, by polling the entity 3.

With reference to FIG. 3, it is assumed that the entity 2 (i.e., the AMF function in the contemplated illustrative example) is interested in being notified of the detection of all or some of the events monitored by the entity 3, for at least one of the elements of the core network CN managed by the entity 3.

The entity 2, via its first communication module 2A, therefore sends a subscription request to the entity 3, in order to acquire information relating to these events (step E10). In the example contemplated herein of a 5G core network defined by the 3GPP standard, this subscription request is carried out by sending an HTTP POST subscription request. It contains the SubscriptionData in its body, namely in this case information indicating the type of notifications that the entity 2 wishes to receive (and, more specifically, which of the one or more events is associated with which of the one or more elements managed by the entity 3), as well as an identifier, or URI, called "callback" identifier, on which the entity 2 wishes to receive the notifications. It should be noted that the subscription request of the entity 2 can relate to one or more elements managed and/or monitored by the entity 3, for example, elements verifying a given criterion (for example, all the NF functions providing a given service or of a given type). In the illustrative example of an entity 2 of the AMF function type, the entity 2 can indicate that it wishes to receive notifications when any one of the creation/deletion or modification events of a profile is detected for the instances of AUSF ("Authentication Server Function"), 5G-EIR ("Equipment Identity Register"), SMF, UDM and PCF network functions managed by the entity 3 (NRF function in this example).

Other information can be specified in the SubscriptionData data, such as, for example, a validity period of the subscription, or one or more conditional parameters, specific to the type of entity 3, which can be monitored to determine whether or not to trigger a notification. In the example of an NRF function, such conditional parameters can be, for example, the attributes of a profile that must be changed in order to trigger a notification or, conversely, those that do not need to be monitored. These conditional parameters allow additional granularity to be provided and the sending of notifications to be limited to the events that are actually relevant to the entity 2.

In addition, according to the invention, the subscription request advantageously comprises, from among the SubscriptionData data, at least one encoding format supported by the entity 2 and that can be used to encode the content of the notifications sent by the entity 3 to the entity 2. In the embodiment described herein, the one or more encoding formats indicated in the subscription request include at least one compression format, such as gzip, deflate or compress. However, in addition or as an alternative embodiment, other encoding formats can be supported by the entity 2 (for example, base64, invariant ("identity") encoding formats, etc.), and indicated thereby in the subscription request.

It should be noted that the entity 2 does not have to indicate all the encoding formats that it supports in the subscription request. It can select one or more specific encoding formats from among those that it supports so that one of them is used during notifications.

Moreover, in a particular embodiment, it is possible to contemplate that the entity 2 defines optionally distinct encoding formats as a function of the events monitored by the entity 3 or of the elements that relate to these events. For example, it is possible to contemplate defining a compression format with a higher compression ratio for content that is known to be large (for example, network function profiles), while a compression format with a lower compression ratio or an invariant encoding format can be indicated 2 for lower notification content. Of course, this example is provided solely by way of an illustration.

In addition, the encoding formats indicated by the entity 2 can change over time: indeed, the entity 2 can update its subscription with the entity 3, using, for example, an HTTP PATCH request comprising the modified subscription data in its body, if applicable.

Furthermore, in the embodiment described herein, the one or more encoding formats supported by the entity 2 and indicated in the SubscriptionData subscription data are provided in a data structure, called, for example, capInfo, comprising at least one communication option supported by the entity 2, with each communication option being provided in a field or in a distinct attribute (for example, in a Content-Encoding field or attribute of the capInfo structure for the encoding formats). Advantageously, this data structure can comprise other communication options that can be used by the entity 3 when sending notifications, such as, for example, content formats (for example, json, xml or the like), supported by the entity 2 (provided, for example, in a Content-Type field or attribute of the capInfo structure), or encryption algorithms allowing critical information to be encrypted that is provided, if applicable, in the notifications issued by the entity 3 (provided, for example, in an Encrypt-type field or attribute of the capInfo structure), etc.

As an alternative embodiment, the one or more encoding formats can be provided in a simple dedicated field or attribute, for example, in a Content-Encoding field or attribute. In yet another alternative embodiment, they can be provided in a proprietary field or attribute provided by the 3GPP standard (known as "vendor-specific extension").

With reference to FIG. 4, the entity 3 receives, via its reception module 3A, the subscription request from the entity 2 (step F10).

In the embodiment described herein, the entity 3 verifies, via its reception module 3A, whether the subscription request formulated by the entity 2 is authorized (test step F20). Notably, it can verify that the subscription data indicated in the subscription request are consistent with the information that it can publish.

If the subscription request is not authorized ("no" response to the test step F20), it is rejected by the entity 3 and the entity 2 is notified as such (step F30).

Otherwise (the subscription request is authorized) ("yes" response to the test step F20), the entity 3 creates a subscription context CNT_SUBS(2) for the entity 2 and stores the SubscriptionData subscription data in the subscription context, including the encoding formats supported by the entity 2 (step F40). An HTTP 201 Created response is then returned to the entity 2 by the entity 3 to notify it of the success of its subscription request (step E20, FIG. 3).

As mentioned above, the monitoring module 3B of the entity 3 is configured to continuously or quasi-continuously (and in real time) monitor the elements managed and/or monitored by the entity 3 and, more specifically, the occurrence of the events that the entity 3 is likely to expose (in the example of the NRF function, the creation/deletion or modification of profiles of network functions managed by the NRF function) (monitoring step F50 and test step F60).

Thus, if the monitoring module 3B of the entity 3 detects one of these events for at least one of the elements that it manages and/or monitors ("yes" response in the test step F60), it verifies whether the detected event corresponds to one of the subscription requests that it has received (test step F70), and more specifically in this case, if the detected event corresponds to the subscription request made by the entity 2. To this end, it consults the subscription data contained in the CNT_SUBS(2) context and compares them with the features of the detected event (for example, with the nature of the event, the element related to this event, etc.).

If no subscription request relates to the detected event ("no" response to the test step F70), no notification is sent, and the entity 3 continues its monitoring (step F50 and subsequent steps).

It is assumed in this case that the detected event corresponds to the subscription request formulated by the entity 2, in other words, the event detected by the monitoring module 3B of the entity 3 corresponds to an event the entity 2 wishes to be notified of ("yes" response in the test step F70).

The entity 3 then sends, via its sending module 3C, a notification to the entity 2 to notify it of the detected event (step F80). This notification in this case is, for example, an HTTP POST request. It comprises, in its body, NotificationData information relating to the detected event that is specific to this event. For example, for an NRF function, this NotificationData information can comprise all or some of the profile of the network function affected by the event or, more specifically, all the attributes of this profile intended to be published if it is a creation of a profile type of event, or if it is a modification of a profile type of event, all the attributes of this profile intended to be published or only those that have been modified. If the event relates to the deletion of a profile (or in the same manner the deregistration of the NF function associated with this profile), the NotificationData information includes the URI of the relevant NF function instance and the type of detected event (i.e., the deletion of the profile or the deregistration of the NF function). According to the invention, the NotificationData information provided in the notification request is encoded by means of one of the encoding formats supported by the entity 2 and stored in the CNT_SUBS(2) context of its subscription. For example, in this case, the sending module 3C selects, in the CNT_SUBS(2) context, a compression format for encoding the NotificationData information. It indicates, in accordance with the HTTP protocol, in the Content-Encoding header of the notification request, the applied encoding format.

In the embodiment described herein, if the capInfo data structure includes communication options other than one or more encoding formats supported by the entity 2, the sending module 3C can also apply these communication options to the NotificationData information in addition to the encoding.

With further reference to FIG. 3, the entity 2 receives, via its second communication module 2B, the notification sent by the entity 3 and notifying it of the detected event (step E30).

The entity 2 extracts the NotificationData information contained in the notification and decodes it as a function of the encoding format applied by the sending module 3C of the entity 3 and indicated in accordance with the HTTP protocol in the headers of the notification request. Then, the processing module 2C uses the information thus decoded, for example, to manage the elements of the core network CN or that are attached thereto, for which the entity 2 is responsible. As mentioned above, how the processing module 2C uses this information depends on the services offered by the entity 2, in the core network CN in this case, and/or on the relevance of this information.

Thus, as can be seen in light of the above, the invention allows the exchanges between the various entities of the system 1 to be optimized simply, and more specifically the notifications sent by the entity 3 to the entity 2. Advantageously, the encoding formats supported by the entity 2, preferably including a compression format, are provided when the entity 2 subscribes to the events monitored by the entity 3, so that the entity 3 can compress the information it sends to the entity 2 without having to implement additional exchanges for negotiating the encoding format to be used. Of course, additional measures also can be implemented, in the core network in this case, to encode other content of requests and/or responses. Thus, in the illustrative example contemplated herein of an entity 3 comprising an NRF function, it is possible to contemplate, for example, that the profiles of the network functions managed by the NRF function each include an attribute containing at least one encoding format supported by the associated network function and that this attribute is published by the NRF function in response to the discovery requests that it receives within the scope of the Nnrf_NFDiscovery service. Advantageously, these encoding formats can be provided when registering the network functions with the NRF function. In this way, the entities initiating the discovery requests addressed to the NRF function can immediately use the provided encoding formats to access the services proposed by the network functions (i.e., without having to issue OPTIONS requests or to wait for a response to a request indicating the encoding formats supported by the network functions).

Moreover, although the invention has been described in the context of a 5G network defined by the 3GPP standard, with reference to network entities of the network functions type, and more specifically to an AMF function and an NRF function belonging to the same core network, the invention can be applied to other entities.

Typically, it can be applied to other network functions of a 3GPP network, consuming events and exposing such events. By way of another example, the 3GPP standard defines, in document TS 29.518 entitled: "Technical Specification Group Core Network and Terminals; 5G System; Access and Mobility Management Services; Stage 3", V16.7.0, March 2021, that NEF, SMF or UDM network functions can subscribe to the notification of events with an AMF network function using the Namf_EventExposure service. These network functions can then choose to be notified of events relating to the access and the mobility of a UE, of a group of UEs, or even of all the UEs managed by this AMF function. The various events exposed by the AMF function are described in document TS 29.518, for example, in paragraph 6.2.6.3.3, in table 6.2.6.3.3-1. Other 3GPP documents define subscription/notification mechanisms between other network functions of a 5G network, and the events exposed by these network functions.

The invention also can be applied to networks other than a 5G network, for example, to a 4G, 6G or next generation network, or to proprietary networks, or to architectures of "event-driven" microservices, etc., whenever a subscription/notification mechanism is implemented in this network and the entities involved in this mechanism are capable of supporting several encoding formats, and in particular at least one compression format. Furthermore, the invention is described with reference to virtualized entities, but it also applies to physical entities. These entities can belong to the same network or to different networks. Thus, for example, the entities 2 and 3 can be NRF functions belonging to two different PLMNs, or the entity 3 can be a network function of a core network and the entity 2 can be an application function inside or outside the core network, or even a user equipment.

The invention also can be applied to protocols other than the HTTP/2 protocol, such as, for example, to another version of the HTTP protocol (HTTP/1. 1), or to SOAP, CORBA, gRPC, QUIC protocols, or generally to any other protocol based on exchanging requests and responses, and supporting encoding of the content of the body of the requests and/or of the responses, typically the compression of this content. The description provided above within the scope of HTTP/2 requests/responses, and in particular the data conveyed by these requests/responses for implementing the invention, is applicable and can be transposed to the requests/responses of these protocols.

Although the present disclosure has been described with reference to one or more examples, workers skilled in the art will recognize that changes may be made in form and detail without departing from the scope of the disclosure and/or the appended claims.

The invention claimed is:

1. A method for subscribing a first communicating entity with a second communicating entity, said method being implemented by the first communicating entity and comprising:
   transmitting a subscription request requesting subscription with the second communicating entity in order to acquire information concerning at least one event monitored by the second communicating entity, with this subscription request indicating at least one encoding format supported by the first communicating entity; and
   following detection by the second communicating entity of one of said events corresponding to the subscription request, receiving, from the second communicating entity, a notification comprising information relating to said detected event that is encoded using one of said encoding formats supported by the first communicating entity and indicated in the subscription request.

2. A method for notifying a first communicating entity of events, implemented by a second communicating entity, said method comprising:
   receiving a subscription request from the first communicating entity in order to acquire information concerning at least one event monitored by the second communicating entity, with this subscription request indicating at least one encoding format supported by the first communicating entity; and
   following detection by the second communicating entity of one of said events corresponding to the subscription request, sending the first communicating entity a notification comprising information relating to said detected event that is encoded using one of said encoding formats supported by the first communicating entity and indicated in the subscription request.

3. The method as claimed in claim 1, wherein at least one entity from among the first communicating entity and the second communicating entity is a network entity, an application function, or a user equipment.

4. The method as claimed in claim 1, wherein at least one entity from among the first communicating entity and the second communicating entity is a network function or an instance of a network function.

5. The method as claimed in claim 1, wherein the second communicating entity is a control entity managing a plurality of application entities of a network.

6. The method as claimed in claim 1, wherein said detected event is a creation, a deletion or a modification of an element managed by the second communicating entity.

7. The method as claimed in claim 1, wherein the notification is a request compliant with a version of the Hypertext Transfer Protocol (HTTP) protocol.

8. The method as claimed in claim 1, wherein said encoding format used to encode information relating to said detected event in the notification is a compression format.

9. The method as claimed in claim 1, wherein, in the subscription request, said at least one encoding format supported by the first communicating entity is provided in a data structure comprising at least one communication option supported by the first communicating entity.

10. A non-transitory computer-readable recording medium storing a computer program comprising instructions which when executed by a processor of a first communicating entity configured the first communicating entity to execute a method of subscribing the first communicating entity with a second communicating entity, comprising:
    transmitting a subscription request requesting subscription with the second communicating entity in order to acquire information concerning at least one event monitored by the second communicating entity, with this subscription request indicating at least one encoding format supported by the first communicating entity; and
    following detection by the second communicating entity of one of said events corresponding to the subscription request, receiving, from the second communicating entity, a notification comprising information relating to said detected event that is encoded using one of said encoding formats supported by the first communicating entity and indicated in the subscription request.

11. A first communicating entity comprising:
    at least one processor; and
    at least one non-transitory computer readable medium comprising instructions stored thereon which when executed by the at least one processor configure the first communicating entity to:
    transmit a subscription request requesting a subscription with a second communicating entity in order to acquire information concerning at least one event monitored by the second communicating entity, the subscription request indicating at least one encoding format supported by the first communicating entity; and
    following detection by the second communicating entity of one of said events corresponding to the subscription request, receive a notification from the second communicating entity comprising information relating to said detected event encoded by using one of said encoding formats supported by the first communicating entity and indicated in the subscription request.

12. A second communicating entity comprising:
at least one processor; and
at least one non-transitory computer readable medium comprising instructions stored thereon which when executed by the at least one processor configure the second communicating entity to:
receive a subscription request from a first communicating entity in order to acquire information concerning at least one event monitored by the second communicating entity, with this subscription request indicating at least one encoding format supported by the first communicating entity;
following detection of one of said events corresponding to the subscription request, send a notification to the first communicating entity comprising information relating to said detected event encoded using one of said encoding formats supported by the first communicating entity and indicated in the subscription request.

13. The method as claimed in claim 2, wherein at least one entity from among the first communicating entity and the second communicating entity is a network entity, an application function, or a user equipment.

14. The method as claimed in claim 2, wherein at least one entity from among the first communicating entity and the second communicating entity is a network function or an instance of a network function.

15. The method as claimed in claim 2, wherein the second communicating entity is a control entity managing a plurality of application entities of a network.

16. The method as claimed in claim 2, wherein said detected event is a creation, a deletion or a modification of an element managed by the second communicating entity.

17. The method as claimed in claim 2, wherein the notification is a request compliant with a version of the Hypertext Transfer Protocol (HTTP) protocol.

18. The method as claimed in claim 2, wherein said encoding format used to encode information relating to said detected event in the notification is a compression format.

19. The method as claimed in claim 2, wherein, in the subscription request, said at least one encoding format supported by the first communicating entity is provided in a data structure comprising at least one communication option supported by the first communicating entity.

20. The method according to claim 1, wherein the at least one encoding format is provided in a body of the subscription request.

* * * * *